(12) United States Patent
Ninomiya et al.

(10) Patent No.: US 9,234,485 B2
(45) Date of Patent: Jan. 12, 2016

(54) FUEL GAS SUPPLY SYSTEM OF GAS ENGINE

(75) Inventors: Makoto Ninomiya, Kobe (JP); Kaoru Nomichi, Ono (JP); Yutaka Suzuki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 321 days.

(21) Appl. No.: 13/880,420

(22) PCT Filed: Oct. 18, 2011

(86) PCT No.: PCT/JP2011/005818
§ 371 (c)(1),
(2), (4) Date: Jun. 7, 2013

(87) PCT Pub. No.: WO2012/053191
PCT Pub. Date: Apr. 26, 2012

(65) Prior Publication Data
US 2013/0247876 A1    Sep. 26, 2013

(30) Foreign Application Priority Data

Oct. 19, 2010    (JP) .................................. 2010-234648

(51) Int. Cl.
*F02M 59/36*    (2006.01)
*F02M 51/00*    (2006.01)
(Continued)

(52) U.S. Cl.
CPC ............ *F02M 51/00* (2013.01); *F02M 21/0239* (2013.01); *F02M 21/0242* (2013.01); *G05D 16/2013* (2013.01); *Y02T 10/32* (2013.01)

(58) Field of Classification Search
CPC .............. F02M 21/02; F02M 21/0239; F02M 21/0242; F02M 69/54; F02D 19/027; F02D 41/0027; F02D 19/0647; F02D 19/0628; F02D 19/0673
USPC ........ 123/458, 457, 469, 511, 65 V; 137/487, 137/482.5, 505.18, 505.14, 14, 102, 487.5, 137/1, 2, 7, 8, 9, 12, 15.21, 15.25, 831, 832, 137/315.03, 315.04, 599.07, 909; 251/30.01, 129.05, 129.21
See application file for complete search history.

(56) References Cited

U.S. PATENT DOCUMENTS

| 6,427,670 B2 * | 8/2002 | Goto ....................... F02B 43/00 123/198 D |
| 6,568,375 B2 * | 5/2003 | Ishikawa ................. F02B 43/00 123/527 |

(Continued)

FOREIGN PATENT DOCUMENTS

| EP | 0 420 599 A2 | 9/1990 |
| EP | 1 936 174 A1 | 6/2008 |

(Continued)

OTHER PUBLICATIONS

Extended Search Report issued in European Patent Application No. 11834037.1 dated Apr. 3, 2014.
(Continued)

*Primary Examiner* — Lindsay Low
*Assistant Examiner* — Long T Tran
(74) *Attorney, Agent, or Firm* — Oliff PLC

(57) ABSTRACT

The present invention provides a fuel gas supply system of a gas engine capable of supplying to a fuel gas supply unit a fuel gas of constant pressure which fluctuates little. In a fuel gas supply system, a high-pressure tank and a gas injector are connected to each other by a supply passage, and an electromagnetic pressure regulating valve is provided on the supply passage. The electromagnetic pressure regulating valve is configured to regulate the pressure of the gas, flowing through the supply passage, to pressure corresponding to a current supplied to the electromagnetic pressure regulating valve. The gas pressure downstream of the electromagnetic pressure regulating valve is detected by a low-pressure-side pressure sensor. A controller is electrically connected to the electromagnetic pressure regulating valve. The controller controls the current supplied to the electromagnetic pressure regulating valve such that pressure detected by the low-pressure-side pressure sensor becomes predetermined target pressure.

7 Claims, 5 Drawing Sheets

(51) Int. Cl.
*F02M 21/02* (2006.01)
*G05D 16/20* (2006.01)

(56) References Cited

U.S. PATENT DOCUMENTS

| | | | | |
|---|---|---|---|---|
| 6,629,544 | B2 * | 10/2003 | Nakajima | G05D 16/0663 137/505 |
| 6,758,233 | B2 * | 7/2004 | Sulatisky | F02D 41/0027 137/102 |
| 7,467,622 | B2 * | 12/2008 | Tokunaga | F02M 21/0239 123/527 |
| 7,661,409 | B2 * | 2/2010 | Schule | F02D 41/0027 123/458 |
| 8,126,636 | B2 * | 2/2012 | Jauss | F02D 19/0647 123/431 |
| 2010/0299047 | A1 * | 11/2010 | Kratt | F02M 43/00 701/103 |

FOREIGN PATENT DOCUMENTS

| | | |
|---|---|---|
| JP | A-4-86362 | 3/1992 |
| JP | A-2001-90615 | 4/2001 |
| JP | A-2002-295313 | 10/2002 |
| JP | A-2006-118519 | 5/2006 |
| WO | WO 01/59537 A1 | 8/2001 |
| WO | WO 2008/087511 A2 | 7/2008 |

OTHER PUBLICATIONS

Jan. 17, 2012 International Search Report issued in International Patent Application No. PCT/JP2011/005818.

* cited by examiner

FUEL GAS SUPPLY SYSTEM OF GAS ENGINE

TECHNICAL FIELD

The present invention relates to a fuel gas supply system of a gas engine, the fuel gas supply system being configured to supply a fuel gas to the gas engine.

BACKGROUND ART

Examples of automobiles include gasoline automobiles using gasoline and diesel automobiles using light oil. In addition to these, gas engine automobiles using a fuel gas, such as a compressed natural gas (CNG) or compressed hydrogen, have been known. In the gas engine automobile, the fuel gas is stored in, for example, a high-pressure tank, and the stored fuel gas of high pressure is supplied to a gas engine through a fuel gas supply system. Known as the fuel gas supply system is, for example, a fuel supply apparatus of a gas engine in PTL 1.

The fuel supply apparatus of the gas engine described in PTL 1 includes a fuel injection valve (gas injector), and the fuel injection valve and a bomb (high-pressure tank) are connected to each other by a pipe. On this pipe, a main stop valve, a regulator, and a low-pressure fuel shutoff valve are provided in this order from the bomb side. Each of the main stop valve and the low-pressure fuel shutoff valve can open and close a passage in the pipe. When stopping the gas engine, each of the main stop valve and the low-pressure fuel shutoff valve closes the passage to shut off the supply of the fuel gas to the gas engine. In contrast, when activating the gas engine, each of the main stop valve and the low-pressure fuel shutoff valve opens the passage to allow the fuel gas to be supplied to the gas engine. The regulator reduces the pressure of the high-pressure fuel gas, flowing from the bomb, to predetermined pressure to introduce the fuel gas to the fuel injection valve.

In the fuel supply apparatus of the gas engine configured as above, the fuel gas stored in the bomb flows through the main stop valve to be introduced to the regulator. The fuel gas is reduced in pressure by the regulator and then flows through the low-pressure fuel shutoff valve to be introduced to the fuel injection valve. The fuel injection valve injects to the gas engine the fuel gas, the amount of which corresponds to a command from, for example, an ECU.

CITATION LIST

Patent Literature

PTL 1: Japanese Laid-Open Patent Application Publication No. 2002-295313

SUMMARY OF INVENTION

Technical Problem

The fuel gas supply system, such as the fuel supply apparatus of the gas engine described in PTL 1, does not include a sensor configured to measure the amount of fuel gas injected from the fuel injection valve. In addition, it is difficult to measure the amount of fuel gas by a sensor or the like. Therefore, the fuel injection valve itself needs to have a function of measuring the amount of gas. For example, the injection amount of fuel gas injected by opening and closing per unit time or the injection amount of fuel gas injected by a single fuel gas injection operation is estimated in advance, and the injection amount of fuel gas is controlled based on an open-close time or the number of injection operations.

The injection amount of fuel gas per unit time or per one injection operation is estimated on the assumption that the pressure of the fuel gas introduced to the fuel injection valve is predetermined constant pressure. However, the pressure of the fuel gas after the pressure reduction by the regulator, that is, secondary pressure generally fluctuates and is not necessarily constant. In addition, the pressure of the fuel gas flowing between the regulator and the fuel injection valve is much lower than the pressure of the fuel gas in the tank, and significant pressure loss occurs thereat. The pressure loss significantly fluctuates depending on the flow rate. As above, the pressure of the fuel gas introduced to the fuel injection valve is not necessarily constant and may be much lower than the estimated value, so that the injection amount of fuel gas injected per unit time or per one injection operation may be widely different from the estimated amount. In this case, a desired output may not be obtained from the gas engine.

Here, a first object of the present invention is to provide a fuel gas supply system of a gas engine, the fuel gas supply system being capable of supplying to a fuel gas supply unit a fuel gas of constant pressure which fluctuates little.

A second object of the present invention is to provide a fuel gas supply system of a gas engine, the fuel gas supply system being configured such that the number of components thereof is reduced.

Solution to Problem

A fuel gas supply system of a gas engine according to the present invention is a system configured to supply a fuel gas to the gas engine, the fuel gas supply system including: a fuel gas supply unit configured to supply the fuel gas to the gas engine; a supply passage configured to connect a high-pressure tank configured to store the fuel gas of high pressure and the fuel gas supply unit; an electromagnetic pressure regulating valve provided on the supply passage and configured to regulate pressure of the fuel gas, flowing through the supply passage, to pressure corresponding to a current supplied to the electromagnetic pressure regulating valve; a control unit configured to control the current supplied to the electromagnetic pressure regulating valve; and a low-pressure-side pressure detecting unit provided closer to the fuel gas supply unit than the electromagnetic pressure regulating valve and configured to detect the pressure of the fuel gas, wherein: the electromagnetic pressure regulating valve is a normally closed valve configured to close the supply passage when the current supplied from the control unit is stopped; and the control unit controls the current such that gas pressure detected by the low-pressure-side pressure detecting unit becomes predetermined target pressure.

According to the present invention, in a case where the pressure of the fuel gas detected by the low-pressure-side pressure detecting unit is not the target pressure, the controller adjusts the current, supplied to the electromagnetic pressure regulating valve, such that the pressure of the fuel gas becomes the target pressure, that is, performs feedback control in which the pressure of the fuel gas is adjusted such that the pressure of the fuel gas becomes the target pressure. By this feedback control, the pressure of the fuel gas is maintained at the target pressure, and the fuel gas of the constant pressure which fluctuates little can be supplied to the fuel gas supply unit.

In the present invention, the electromagnetic pressure regulating valve is a normally closed valve. Therefore, by stopping the current supplied to the electromagnetic pressure regulating valve to adjust the pressure of the fuel gas, the supply passage can be urgently shut off. With this, for example, even if an unintended high-pressure fuel gas is supplied to the fuel gas supply unit, the supply passage can be immediately shut off, and the fuel gas supply unit can be prevented from being damaged. Since the electromagnetic pressure regulating valve has the shutoff function, the number of shutoff valves provided on the supply passage can be reduced, and therefore the manufacturing cost of the fuel gas supply system can be reduced. By reducing the number of components of the fuel gas supply system, the pressure loss in the fuel gas supply system can be reduced, and the fuel gas supply system can be reduced in size.

In the above invention, it is preferable that: the electromagnetic pressure regulating valve include a housing including a valve passage connecting a primary port connected to the high-pressure tank and a secondary port connected to the gas engine, a valve body provided in the housing and configured to move between a closed position where the valve body closes the valve passage and an open position where the valve body opens the valve passage to control an opening degree of the valve passage, a return spring configured to bias the valve body in a direction toward the closed position, an electromagnetic proportional solenoid configured to apply a magnetizing force, corresponding to the current supplied from the control unit, to the valve body to cause the valve body to move in a direction toward the open position, a bearing member interposed between the valve body and the housing and configured to support the valve body such that the valve body is able to slide between the closed position and the open position, and a first sealing member and a second sealing member configured to respectively seal both sides of the bearing member; a pressure return chamber connected to the secondary port be formed in the housing; and the second sealing member apply an acting force, corresponding to internal pressure of the pressure return chamber, to the valve body to cause the valve body to move in the direction toward the closed position.

According to the above configuration, the opening degree of the valve passage is changed by changing the magnetizing force of the electromagnetic proportional solenoid. With this, the pressure output from the secondary port, that is, the secondary pressure can be regulated. By setting the magnetizing force to a force corresponding to the target pressure, the secondary pressure can be controlled to the target pressure. The secondary pressure is introduced to the pressure return chamber, and the second sealing member applies an acting force, corresponding to internal pressure of the pressure return chamber, to the valve body to cause the valve body to move in the direction toward the closed position. The valve body which receives the above acting force moves up to a position where the forces, such as the secondary pressure received by the valve body, the acting force from the second sealing member, the magnetizing force, and the biasing force of the return spring, acting on the valve body are balanced. In order to balance the above forces, the opening degree of the valve passage is adjusted. With this, even if the secondary pressure fluctuates, the opening degree of the valve passage is adjusted, and the secondary pressure is returned to the target pressure. Therefore, the secondary pressure is maintained at the target pressure. Since the electromagnetic pressure regulating valve can maintain the secondary pressure at the target pressure as above, it is high in pressure controllability and can regulate the pressure of the high-pressure fuel gas more precisely.

Further, in the present invention, since the valve body can move smoothly by the bearing member, the followability with respect to the target pressure is improved. Then, since the first and second sealing members are respectively provided on both sides of the bearing member, the fuel gas does not flow toward the bearing member, and the bearing member is prevented from being exposed to the fuel gas. With this, a material having no corrosion resistance to the fuel gas can be used as a material of the bearing member, and this increases material options of the bearing member. Further, for example, when the bearing member is lubricated with grease, the grease can be prevented from flowing out to the secondary port side together with the fuel gas. With this, the smooth movement of the valve body can be realized, and the grease can be prevented from being mixed with the fuel gas.

In the above invention, it is preferable that: the valve body include a secondary side pressure receiving portion on which pressure of the secondary port acts in a direction in which the valve body moves toward the open position and a pressure return chamber side pressure receiving portion on which pressure of the pressure return chamber acts in a direction in which the valve body moves toward the closed position; and a pressure receiving area of the pressure return chamber side pressure receiving portion be larger than a pressure receiving area of the secondary side pressure receiving portion.

According to the above configuration, the secondary side pressure receiving portion and the pressure return chamber side pressure receiving portion receive the secondary pressure. Since the pressure receiving area of the pressure return chamber side pressure receiving portion is larger than that of the secondary side pressure receiving portion, the forces acting on the pressure receiving portions act in the direction toward the closed position. Therefore, when the electromagnetic proportional solenoid is not driving, the valve body is biased in the direction toward the closed position. Thus, a more reliable normally closed valve structure can be realized.

In the above invention, it is preferable that: the valve body include a first pressure receiving surface on which pressure of the primary port acts in a direction in which the valve body moves toward the open position and a second pressure receiving surface on which the pressure of the primary port acts in a direction in which the valve body moves toward the closed position; and a pressure receiving area of the first pressure receiving surface and a pressure receiving area of the second pressure receiving surface be substantially equal to each other.

According to the above configuration, the primary pressure received by the first pressure receiving surface and the primary pressure received by the second pressure receiving surface cancel each other. With this, the fluctuation in the acting force applied to the valve body due to the fluctuation in the primary pressure can be substantially prevented, and the pressure controllability of the secondary pressure can be further improved. In addition, the magnetizing force of the electromagnetic proportional solenoid can be reduced, and the electromagnetic pressure regulating valve can be reduced in size.

In the above invention, it is preferable that the low-pressure-side pressure detecting unit be provided near the gas supply unit.

According to the above configuration, the pressure of the fuel gas introduced to the fuel gas supply unit can be controlled to the target pressure regardless of the fuel gas pressure loss caused in the supply passage and various devices provided on the supply passage. Therefore, the degree of freedom of the length of the supply passage, the configurations of the devices provided on the supply passage, and the like increases. Thus, the degree of freedom of the design of the fuel gas supply system improves.

In the above invention, it is preferable that when the gas pressure detected by the low-pressure-side pressure detecting unit becomes predetermined allowable pressure or higher, the control unit stop the current supplied to the electromagnetic pressure regulating valve.

According to the above configuration, when the pressure of the fuel gas introduced to the fuel gas supply unit increases sharply the supply of the fuel gas to the fuel gas supply unit can be stopped. With this, the pressure of the fuel gas in the fuel gas supply unit can be prevented from becoming abnormal pressure that is allowable pressure or higher.

In the above invention, it is preferable that the fuel gas supply system further include an electromagnetic on-off valve provided on the supply passage so as to be located upstream of the electromagnetic pressure regulating valve and configured to be able to shut off supply of the fuel gas to the electromagnetic pressure regulating valve.

According to the above configuration, two valves that are the electromagnetic pressure regulating valve and the electromagnetic on-off valve each having the shutoff function are provided between the high-pressure tank and the fuel gas supply unit, and these two valves can shut off communication between the high-pressure tank and the fuel gas supply unit. By providing two valves each having the shutoff function as above, the redundancy of the shutoff function of the fuel gas supply system can be realized, and the safety of the fuel gas supply system can be improved.

In the above invention, it is preferable that the electromagnetic pressure regulating valve be included in an in tank type or on tank type container main valve provided at a supply port of the high-pressure tank.

According to the above configuration, since the electromagnetic pressure regulating valve is provided at the supply port of the high-pressure tank, the output pressure level from the high-pressure tank becomes low pressure. Thus, the safety of the system improves.

Advantageous Effects of Invention

The present invention can provide a fuel gas supply system of a gas engine, the fuel gas supply system being capable of supplying to a fuel gas supply unit a fuel gas of constant pressure which fluctuates little.

The above object, other objects, features and advantages of the present invention will be made clear by the following detailed explanation of preferred embodiments with reference to the attached drawings.

DESCRIPTION OF EMBODIMENTS

Figure 1:
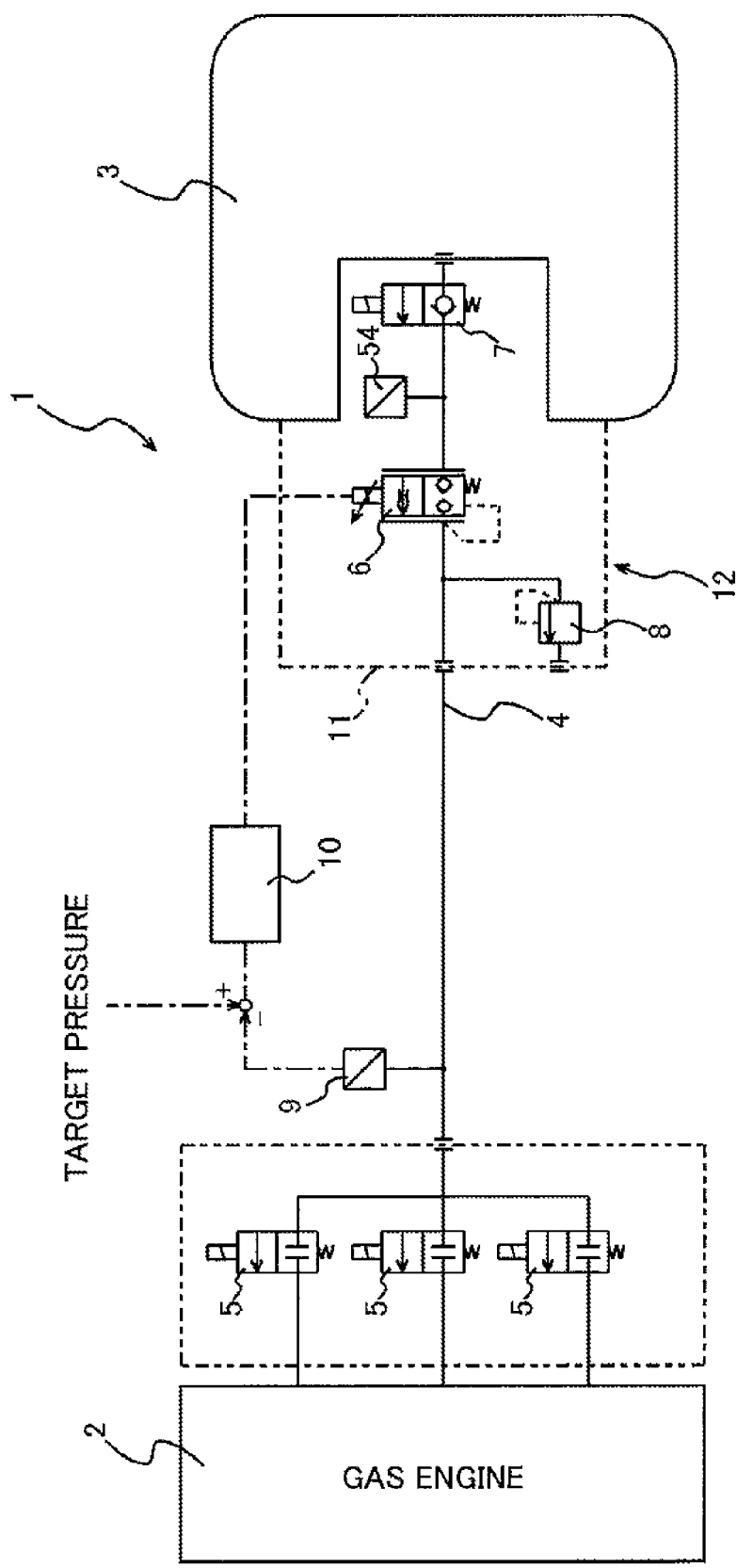
FIG. 1 is a circuit diagram showing the configuration of a fuel gas supply system of Embodiment 1.

Hereinafter, fuel gas supply systems 1 and 1A to 1C of gas engines 2 (hereinafter may be simply referred to as "fuel gas supply systems") according to Embodiments 1 to 4 of the present invention will be explained in reference to the drawings. Each of the fuel gas supply systems 1 and 1A to 1C explained below is just one embodiment of the present invention, and the present invention is not limited to the embodiments. Additions, eliminations, and modifications may be made within the spirit of the present invention.

Embodiment 1

A vehicle, such as a compressed natural gas automobile or a hydrogen gas automobile, includes a gas engine 2, a high-pressure tank 3, and a fuel supply system 1. The gas engine 2 combusts a fuel gas (such as a compressed natural gas (CNG) or a hydrogen gas) to generate a driving force, thereby causing driving wheels to move. The gas engine 2 is connected to the high-pressure tank 3 via the fuel supply system 1. The high-pressure tank 3 can store a high-pressure fuel gas of, for example, 35 to 70 MPa or higher. The fuel gas supply system 1 supplies the fuel gas, stored in the high-pressure tank 3, to the gas engine 2. Hereinafter, the configuration of the fuel gas supply system 1 will be explained.

Supply Circuit

The fuel gas supply system 1 adjusts the amount of fuel gas supplied to the gas engine 2 in accordance with an input of an input unit, not shown, such as an accelerator pedal. The fuel gas supply system 1 includes a supply passage 4, gas injectors 5, an electromagnetic pressure regulating valve 6, an electromagnetic on-off valve 7, a safety relief valve 8, a low-pressure-side pressure sensor 9, and a controller 10. The supply passage 4 is a passage through which the fuel gas flows, and one end thereof is connected to the high-pressure tank 3. The gas injectors 5 are provided at the other end side of the supply passage 4. The other end side of the supply passage 4 does not have to branch into a plurality of passages.

The gas injectors 5 that are fuel gas supply units directly or indirectly inject the fuel gas into the gas engine 2 to supply the fuel gas to the gas engine 2. The gas injectors 5 are connected to an ECU (Electronic Control Unit), not shown. The ECU executes a duty control operation of changing a duty ratio with respect to the gas injector 5 to adjust the amount (to be specific, the injection amount) of fuel gas injected to the gas engine 2. The electromagnetic pressure regulating valve 6 is provided on the supply passage 4 so as to be located upstream of the gas injectors 5.

The electromagnetic pressure regulating valve 6 is provided on the supply passage 4. The electromagnetic pressure regulating valve 6 regulates the pressure of the high-pressure fuel gas, flowing out from the high-pressure tank 3, to low constant pressure to supply the fuel gas to the gas engine 2. Although the specific configuration of the electromagnetic pressure regulating valve 6 will be described later, the electromagnetic pressure regulating valve 6 is a normally closed valve and shuts off the supply passage 4 by stopping a current flowing therethrough. The electromagnetic on-off valve 7 is located upstream of the electromagnetic pressure regulating valve 6. The electromagnetic on-off valve 7 is provided on the supply passage 4 and opens and closes the supply passage 4. When a manipulating unit, not shown, is manipulated, the electromagnetic on-off valve 7 opens or closes the supply passage 4. When the pressure downstream of the electromagnetic pressure regulating valve 6 becomes allowable pressure (for example, pressure higher than normal pressure and lower than withstand pressure of the gas injector 5), each of the electromagnetic pressure regulating valve 6 and the electromagnetic on-off valve 7 shuts off the supply passage 4 by shutting off the current flowing therethrough. As above, since two valves 6 and 7 each having the shutoff function are provided on the supply passage 4, the redundancy of the shutoff function of the fuel gas supply system 1 is realized.

With this, the shutoff performance of the supply passage 4 can be improved, and the safety of the fuel gas supply system 1 can be improved.

The electromagnetic on-off valve 7 and the electromagnetic pressure regulating valve 6 provided on the supply passage 4 as above are provided at an opening portion of the high-pressure tank 3. The electromagnetic on-off valve 7 and the electromagnetic pressure regulating valve 6 are formed integrally with a valve block 11 configured to close the opening portion. These two valves 6 and 7 constitute a container main valve 12. The container main valve 12 is constituted as an electromagnetic container main valve including these two valves 6 and 7 as in tank type or on tank type electromagnetic valves. By including the electromagnetic pressure regulating valve 6 in the container main valve 12 as above, the output pressure level from the high-pressure tank 3 can be reduced to low pressure. Thus, the safety of the fuel gas supply system 1 significantly improves. Since the electromagnetic on-off valve 7 can be remotely manipulated by a current, the high-pressure tank 3 can be urgently shut off during, for example, an emergency. Thus, the safety of the fuel gas supply system 1 can be improved.

A high-pressure-side pressure sensor 54 is provided between the electromagnetic on-off valve 7 and the electromagnetic pressure regulating valve 6. The remaining amount of gas in the tank 3 is confirmed by the pressure measured by the high-pressure-side pressure sensor 54. Further, the safety relief valve 8 and the low-pressure-side pressure sensor 9 are connected to the supply passage 4 so as to be located between the electromagnetic pressure regulating valve 6 and the gas injector 5 and provided in this order from the upstream side. The safety relief valve 8 is a so-called relief valve and provided in the valve block 11. The safety relief valve 8 operates when the pressure downstream of the electromagnetic pressure regulating valve 6 becomes higher than predetermined limit pressure. The low-pressure-side pressure sensor 9 that is a low-pressure-side pressure detecting unit detects the pressure downstream of the electromagnetic pressure regulating valve 6, that is, pressure of a low-pressure side of the supply passage 4. The low-pressure-side pressure sensor 9 is electrically connected to the controller 10 and transmits detected pressure to the controller 10.

The controller 10 that is a control unit is connected to the ECU and the low-pressure-side pressure sensor 9. The controller 10 receives target pressure from the ECU. The controller 10 adjusts a current, supplied to the electromagnetic pressure regulating valve 6, to control the pressure of the gas flowing to the gas injector 5. Specifically, the controller 10 adjusts the current, supplied to the electromagnetic pressure regulating valve 6, based on the target pressure and the detected pressure of the low-pressure-side pressure sensor 9, that is, performs feedback control in which the pressure of the gas flowing to the gas injector 5 is adjusted such that the detected pressure becomes the target pressure.

The low-pressure-side pressure sensor 9 configured to perform a part of the feedback control may be provided at any position as long as it is located downstream of the safety relief valve 8. However, it is preferable that the low-pressure-side pressure sensor 9 be provided on the supply passage 4 so as to be close to the gas injector 5 (it is desirable that the low-pressure-side pressure sensor 9 be provided as close to the gas injector 5 as possible). In the fuel gas supply system 1, the controller 10 adjusts the current, supplied to the electromagnetic pressure regulating valve 6, such that the pressure detected by the low-pressure-side pressure sensor 9 becomes the target pressure regardless of the fuel gas pressure loss caused in the supply passage 4 and various devices provided on the supply passage 4. Therefore, by providing the low-pressure-side pressure sensor 9 close to the gas injector 5, the fuel gas of pressure closer to the target pressure can be supplied to the gas injector 5. On this account, the degree of freedom of the length of the supply passage 4, the configurations of the devices provided on the supply passage 4, and the like increases. Thus, the degree of freedom of the design of the fuel gas supply system 1 improves.

It is desirable that in the gas engine automobile, the fuel gas of constant pressure be supplied to the gas injector 5 and the gas engine 2. Therefore, the above-described fuel gas supply system 1 can be suitably applied to the gas engine automobile. Moreover, in the fuel gas supply system 1 configured to supply the constant pressure, the target pressure is just set to a constant value. Thus, the supply system can be realized by a simple control system.

Further, the controller 10 is electrically connected to the electromagnetic pressure regulating valve 6. When the pressure detected by the low-pressure-side pressure sensor 9 exceeds the allowable pressure, the controller 10 activates the electromagnetic pressure regulating valve 6 to shut off the supply passage 4.

Electromagnetic Pressure Regulating Valve

Hereinafter, the configuration of the electromagnetic pressure regulating valve 6 provided in the fuel gas supply system 1 will be explained in detail. In the following explanations, the concept of directions, such as upper, lower, left, right, front, and rear directions, is used for convenience of explanation and does not indicate that the arrangements, directions, and the like of components of the electromagnetic pressure regulating valve 6 are limited to such directions. In addition, the electromagnetic pressure regulating valve 6 explained below is just one embodiment of the electromagnetic pressure regulating valve, and the present invention is not limited to the embodiments below. Additions, eliminations, and modifications may be made within the spirit of the present invention.

Figure 2:
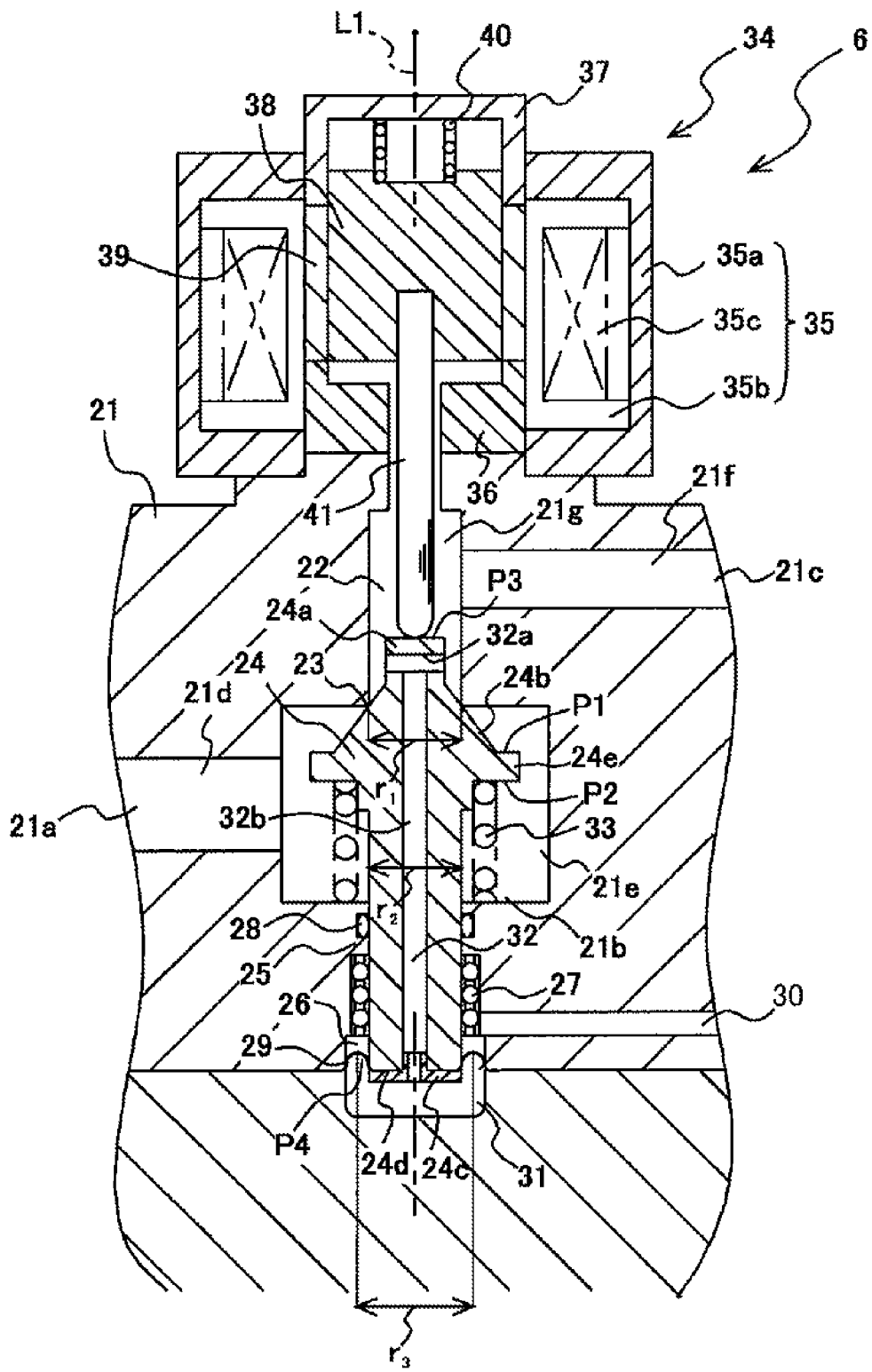
FIG. 2 is a cross-sectional view showing the configuration of an electromagnetic pressure regulating valve included in the fuel gas supply system of Embodiment 1.
Figure 3:
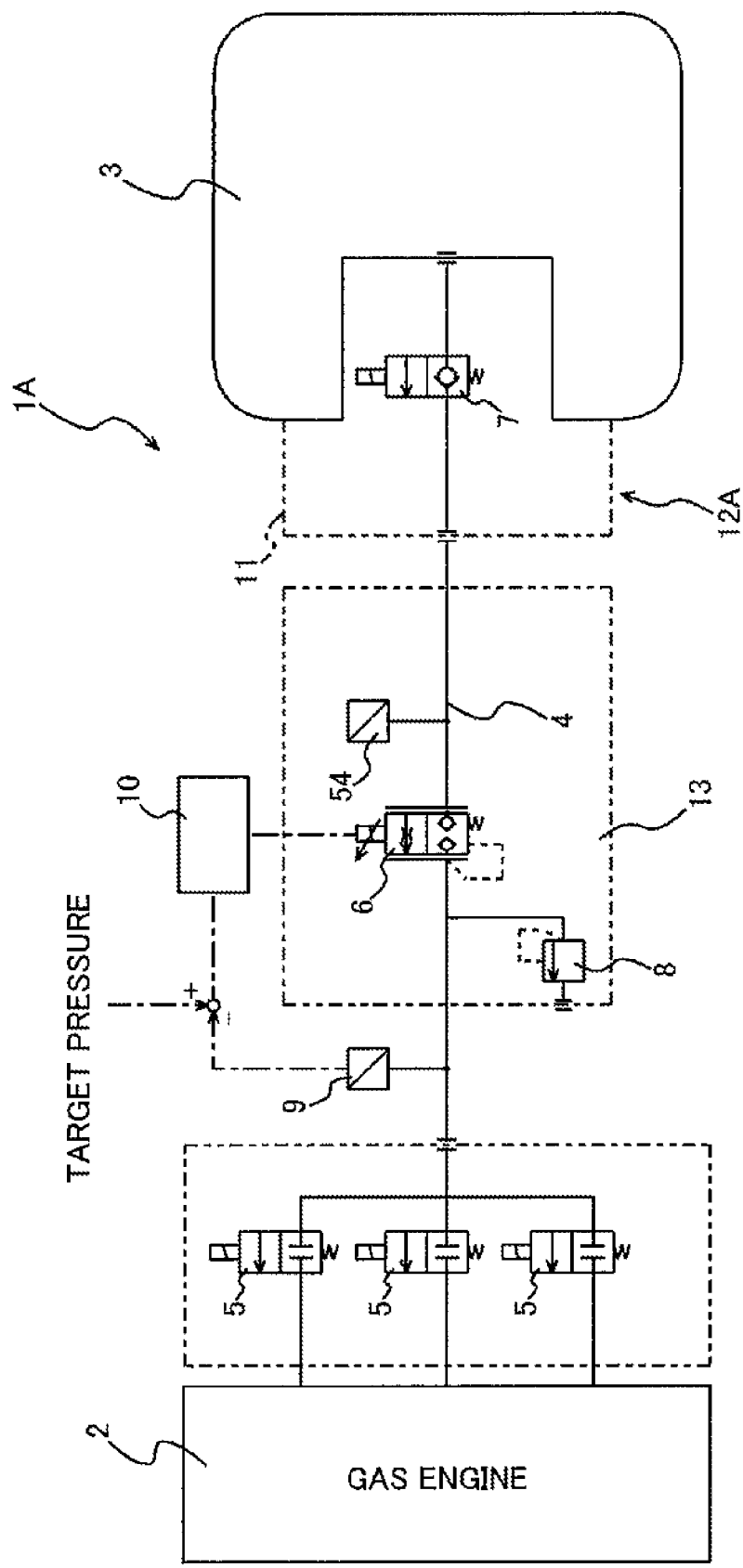
FIG. 3 is a circuit diagram showing the configuration of the fuel gas supply system of Embodiment 2.
Figure 4:
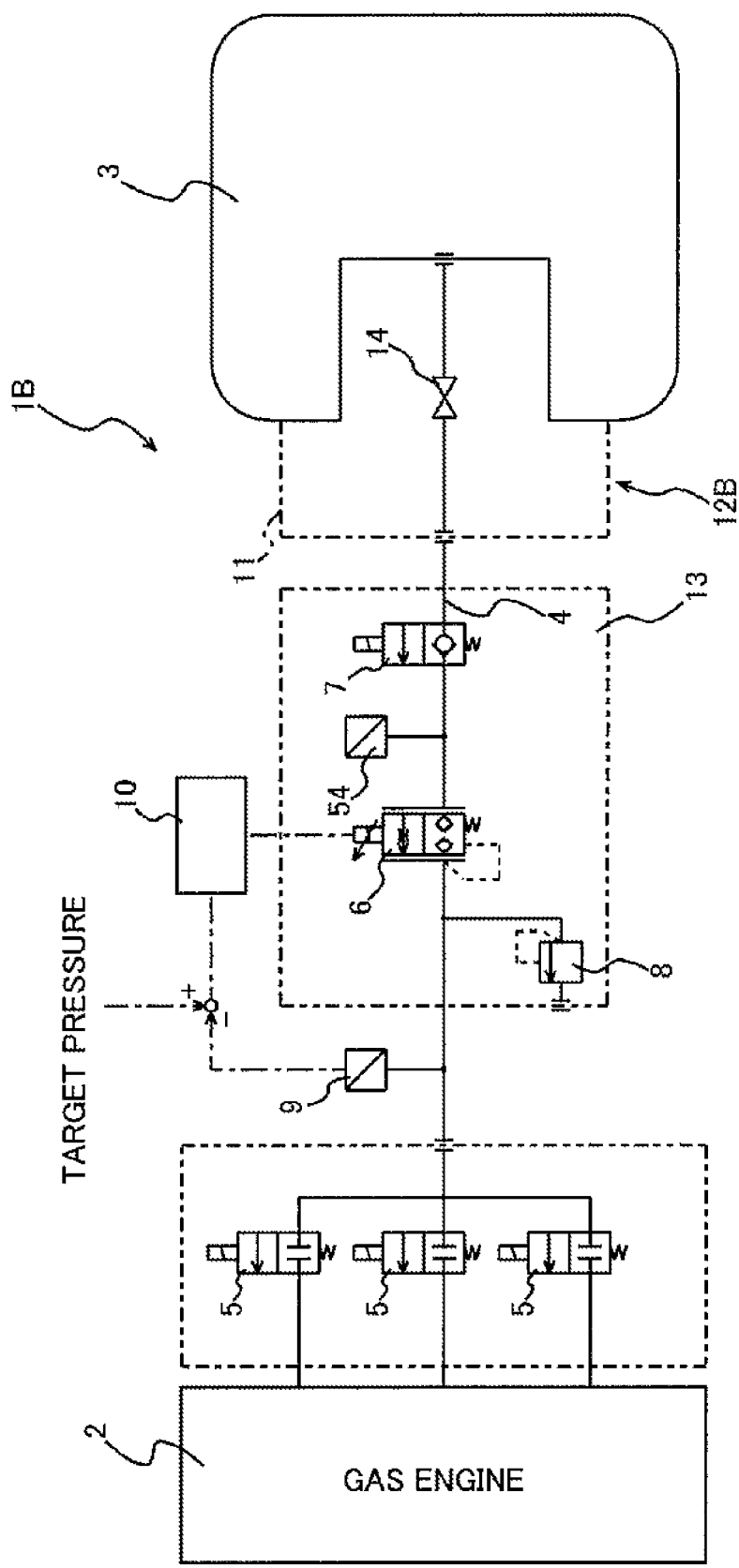
FIG. 4 is a circuit diagram showing the configuration of the fuel gas supply system of Embodiment 3.
Figure 5:
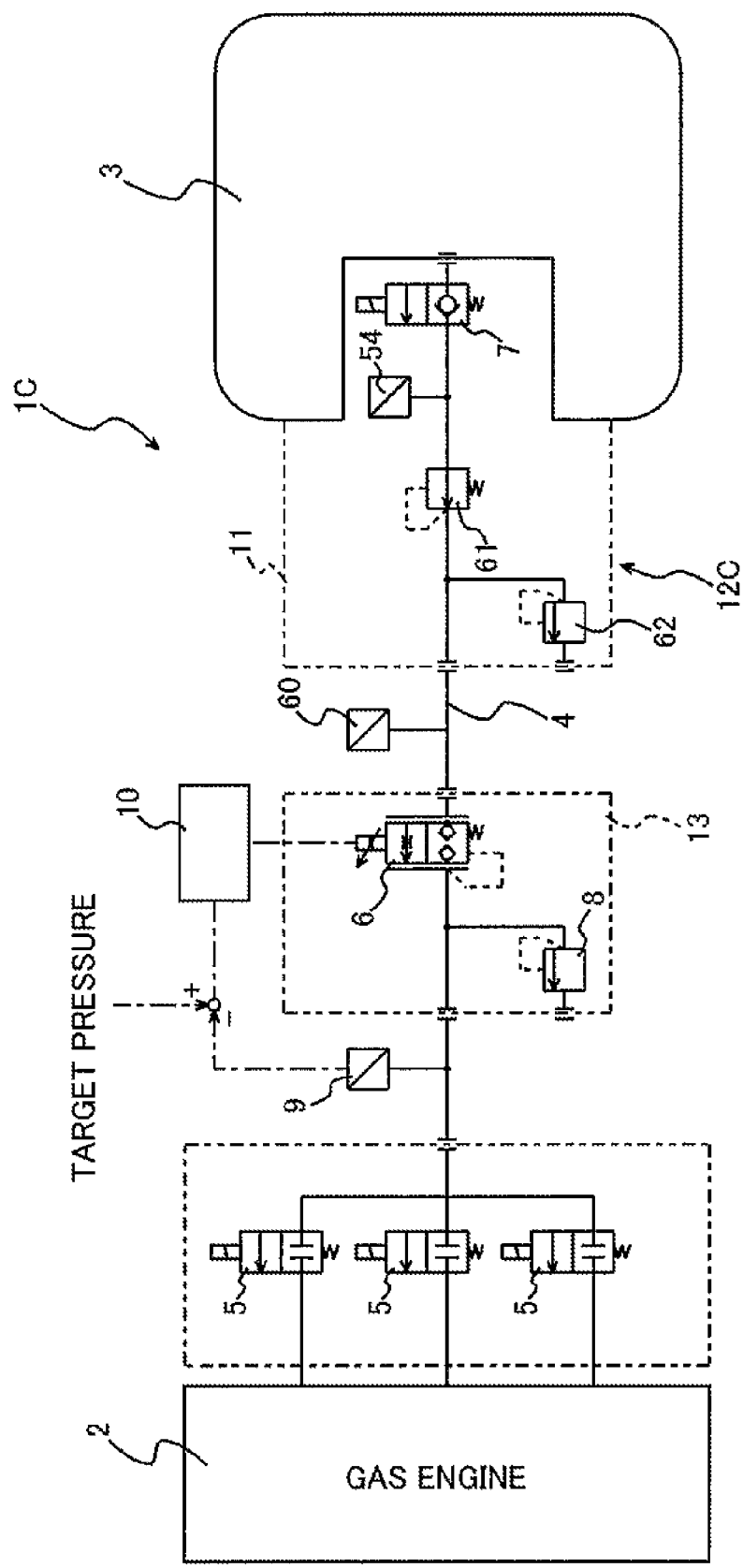
FIG. 5 is a circuit diagram showing the configuration of the fuel gas supply system of Embodiment 4.

As shown in FIG. 2, the electromagnetic pressure regulating valve 6 includes a housing 21. A primary port 21$a$, a valve body hole 21$b$, and a secondary port 21$c$ are formed on the housing 21. The primary port 21$a$ is connected to the electromagnetic on-off valve 7 (see FIG. 1) and also connected to the valve body hole 21$b$ through a primary side passage 21$d$ formed on the housing 21.

The valve body hole 21$b$ extends along an axis line L1 extending in the upper-lower direction and has a circular cross section. The valve body hole 21$b$ includes a valve space 21$e$ at an intermediate portion thereof, the valve space 21$e$ being larger in diameter than the other portion of the valve body hole 21$b$. The primary side passage 21$d$ is connected to the valve space 21$e$. The valve body hole 21$b$ is connected to a secondary side passage 21$f$ at a secondary side region 21$g$ located above the valve space 21$e$. The secondary side passage 21$f$ is formed in the housing 21, and the valve body hole 21$b$ is connected to the secondary port 21$c$ through the secondary side passage 21$f$. The secondary port 21$c$ is connected to the gas injector 5 through the supply passage 4 (see FIG. 1). As above, the primary port 21$a$ and the secondary port 21$c$ are connected to each other through the primary side passage 21$d$, the valve space 21$e$, the secondary side region 21$g$, and the secondary side passage 21$f$. The primary side passage 21$d$, the valve space 21$e$, the secondary side region 21$g$, and the secondary side passage 21$f$ constitute a valve passage 22 configured to connect the primary port 21$a$ and the secondary port 21$c$.

The housing 21 includes a seat portion 23. The seat portion 23 is located in the vicinity of an opening connecting the secondary side region 21$g$ and the valve space 21$e$ and is formed to surround this opening. A valve body 24 is inserted in the valve body hole 21*b* of the housing 21 so as to be seated (pressed) on the seat portion 23. The valve body 24 is located along the axis line L1 of the valve body hole 21*b*, and a tip end portion (to be specific, an upper end portion) 24*a* thereof is located at the secondary side region 21*g*. The valve body 24 has a substantially columnar shape and includes a tapered portion 24*b* located on the tip end portion 24*a* side. The tapered portion 24*b* has a tapered shape toward an upper side. When the valve body 24 is located at a closed position as shown in FIG. 2, the valve body 24 is seated on the seat portion 23 to close the valve passage 22.

Further, the housing 21 includes a seal attaching portion 25 located below the valve space 21*e*. The seal attaching portion 25 is formed on an inner peripheral surface of the housing 21 so as to project toward the valve body hole 21*b* and is formed on the inner peripheral surface along the entire periphery in a circumferential direction. The seal attaching portion 25 is formed in an annular shape, and an inner diameter thereof is substantially equal to each of a hole diameter of the secondary side region 21*g* and an outer diameter of the valve body 24 (an outer diameter of a portion of the valve body 24, the portion being located closer to a lower end 24*d* than the tapered portion 24*b*). An inner diameter of a portion of the housing 21 located below the seal attaching portion 25 is larger than the inner diameter of the seal attaching portion 25. With this, a bearing member accommodating space 26 having a substantially annular shape is formed between the housing 21 and the valve body 24. A bearing member 27 is accommodated in the bearing member accommodating space 26.

The bearing member 27 is formed to have a substantially cylindrical shape and is constituted by a ball guide, a ball bearing, a slide bearing, or the like. The bearing member 27 is externally attached to the valve body 24, interposed between the valve body 24 and the housing 21, and supports the valve body 24. With this, the valve body 24 can move smoothly in the housing 21 along the axis line L1 in the upper-lower direction. In order to further smoothen the movement of the valve body 24 and improve the durability of the bearing member 27, the bearing member 27 is lubricated with grease.

In order to seal the bearing member accommodating space 26, a high-pressure sealing member 28 is provided on an upper side of the bearing member accommodating space 26 in which the bearing member 27 is provided as above. The high-pressure sealing member 28 is attached so as to be fitted in an inner peripheral portion of the seal attaching portion 25 and is provided on an outer periphery of the valve body 24. The high-pressure sealing member 28 provided as above seals a gap between the valve body 24 and the seal attaching portion 25.

In addition, in order to seal the bearing member accommodating space 26, a diaphragm seal 29 is provided on a lower side of the bearing member accommodating space 26. The diaphragm seal 29 that is a second sealing member is a diaphragm formed in a substantially annular shape and is provided on an outer periphery of the valve body 24. An inner edge portion of the diaphragm seal 29 is attached to the valve body 24, and an outer edge portion thereof is attached to the housing 21. More specifically, the inner edge portion of the diaphragm seal 29 is attached to the valve body 24 so as to be sandwiched between the lower end 24*d* of the valve body 24 and an attaching member 24*c* attached to the lower end 24*d*. Here, the housing 21 is configured to be separable into two parts that are upper and low portions, and the outer edge portion of the diaphragm seal 29 is attached to the housing 21 so as to be sandwiched between these two parts.

As above, the upper and lower sides of the bearing member 27 are sealed by two sealing members 28 and 29. With this, the bearing member accommodating space 26 is shut off and separated from other spaces (for example, the valve space 21*e* and the secondary side region 21*g*) formed in the housing 21. Therefore, the bearing member 27 is not exposed to the fuel gas. On this account, a material having no corrosion resistance to the fuel gas can be used as a material of the bearing member, and this increases material options of the bearing member.

In addition, the grease for lubricating the bearing member 27 is not exposed to the fuel gas and does not leak to the other space, such as the valve space 21*e* or the secondary port 21*c*, in the housing 21. Therefore, the grease can be prevented from being mixed with the fuel gas, and influences on downstream devices by the leakage of the grease can be avoided. In addition, the grease can be prevented from drying up, and a good lubrication state of the bearing member 27 can be maintained. With this, the durability of the bearing member 27 can be improved, and the valve body 24 can be moved smoothly. Although the bearing member accommodating space 26 is separated from the other spaces, and the grease does not leak from the bearing member accommodating space 26 to the other spaces, the bearing member accommodating space 26 is connected to an atmosphere communication passage 30 formed in the housing 21 and is open to the atmosphere through the atmosphere communication passage 30. The grease can be supplied through the atmosphere communication passage 30.

A pressure return chamber 31 is formed at a portion of the valve body hole 21*b*, the portion being located on a lower side of the diaphragm seal 29. The pressure return chamber 31 is a substantially disc-shaped space surrounded by a bottom portion of the housing 21 and the diaphragm seal 29. The lower end 24*d* of the valve body 24 is located in the pressure return chamber 31 formed in the housing 21 as above. The diaphragm seal 29 seals between the pressure return chamber 31 and the bearing member accommodating space 26. The pressure return chamber 31 is connected to the secondary side passage 21*f* through a pressure equalizing passage 32 formed in the valve body 24.

The pressure equalizing passage 32 includes a secondary side communication portion 32*a* and a communication portion 32*b*. The secondary side communication portion 32*a* extends so as to penetrate the tip end portion 24*a* of the valve body 24 in a radial direction of the valve body 24, and both ends thereof are open to the secondary side region 21*g*. The communication portion 32*b* is connected to the secondary side communication portion 32*a*. The communication portion 32*b* is formed along an axis (which substantially coincides with the axis line L1 in the present embodiment) of the valve body 24. An upper end of the communication portion 32*b* is connected to the secondary side communication portion 32*a*, and a lower end thereof is connected to the pressure return chamber 31. Therefore, the secondary port 21*c* and the pressure return chamber 31 are connected to each other through the pressure equalizing passage 32, and secondary pressure $p_2$ introduced to the secondary port 21*c* is introduced to the pressure return chamber 31 through the pressure equalizing passage 32.

The valve body 24 includes a flange 24*e*. The flange 24*e* is formed below the tapered portion 24*b* along the entire periphery of the valve body 24 in the circumferential direction and projects further from the tapered portion 24*b* in a radially outward direction. The flange 24*e* is located so as to be opposed to an upper end of the seal attaching portion 25. A return spring 33 is provided between the flange 24*e* and the upper end of the seal attaching portion 25. The return spring 33 is a so-called compression coil spring, is externally attached to the valve body 24 in a compressed state, and biases the valve body 24 in a direction toward the closed position (in such a direction that the valve body 24 moves toward the closed position). The biased valve body 24 is seated on the seat portion 23 to close the valve passage 22. An electromagnetic proportional solenoid 34 is provided at an opening end portion (that is, an upper end portion) of the housing 21 in order to apply to the valve body 24 a force against the biasing of the return spring 33.

The electromagnetic proportional solenoid 34 that is an exciting unit is threadedly engaged with and fixed to an outer periphery of the opening end portion of the housing 21. The electromagnetic proportional solenoid 34 includes a solenoid coil 35. The solenoid coil 35 is formed to have a substantially cylindrical shape, and the housing 21 is threadedly engaged with a lower end side of the solenoid coil 35. The solenoid coil 35 includes a substantially cylindrical case 35$a$, and a bobbin 35$b$ and a coil wire 35$c$ are provided in the case 35$a$. The bobbin 35$b$ is formed to also have a substantially cylindrical shape. The solenoid coil 35 is constituted by winding the coil wire 35$c$ around the bobbin 35$b$. The coil wire 35$c$ is electrically connected to the controller 10. A yoke 36 is provided in the solenoid coil 35 so as to be located at a lower end portion of the solenoid coil 35, and an upper end portion of the solenoid coil 35 is closed by a cover 37. A movable member 38 is provided between the yoke 36 and the cover 37.

The movable member 38 is made of a magnetic material and is formed to have a substantially columnar shape. The movable member 38 is provided along the axis line L1. An outer diameter of the movable member 38 is smaller than an inner diameter of the solenoid coil 35. A guide member 39 having annular shape is interposed between the movable member 38 and the solenoid coil 35. The guide member 39 is made of a non-magnetic material and supports the movable member 38 such that the movable member 38 can slide along the axis line L1 in the upper-lower direction. The yoke 36 is opposed to a lower end portion of the movable member 38 in the upper-lower direction so as to be spaced apart from the lower end portion of the movable member 38. The yoke 36 is made of a magnetic material and is formed to have a substantially annular shape. The yoke 36 and the movable member 38 are magnetized by supplying a current to the solenoid coil 35, and the yoke 36 attracts the movable member 38.

A compression coil spring 40 is provided between an upper end portion of the movable member 38 and the cover 37. The movable member 38 is being biased toward the valve body 24 by the compression coil spring 40. A pushing member 41 is provided at the lower end portion of the movable member 38. The pushing member 41 extends along the axis line L1 and is inserted through the yoke 36. A base end portion of the pushing member 41 is fixed to the movable member 38. A tip end of the pushing member 41 is formed to have a partially spherical shape and contacts the tip end portion 24$a$ of the valve body 24. The pushing member 41 is biased by the compression coil spring 40 via the movable member 38, and the tip end thereof is pressed on the tip end portion 24$a$ of the valve body 24. Therefore, by supplying the current to the solenoid coil 35, the movable member 38 is attracted toward the yoke 36, and the pushing member 41 pushes the valve body 24 in a direction toward an open position by a force corresponding to the supplied current. Thus, the valve passage 22 opens.

In the electromagnetic pressure regulating valve 6 configured as above, the tapered portion 24$b$ of the valve body 24 and an upper surface of the flange 24$e$ (that is, a pressure receiving surface P1 corresponding to a first pressure receiving surface) receive primary pressure $p_1$, having been introduced from the high-pressure tank 3 to the valve space 21$e$, in the direction toward the open position, ad a lower surface of the flange 24$e$ (that is, a pressure receiving surface P2 corresponding to a second pressure receiving surface) receives the primary pressure $p_1$ in the direction toward the closed position. The pressure receiving surface P1 is a partial region of the tapered surface, the region being located on a radially outer side of the secondary side region 21$g$ in plan view. The primary pressure $p_1$ applied to the pressure receiving surface P1 and the primary pressure $p_1$ applied to the pressure receiving surface P2 respectively act in directions opposite to each other and cancel each other. The pressure receiving areas of the pressure receiving surfaces P1 and P2 are substantially equal to each other since an outer diameter $r_2$ of a portion of the valve body 24 and the inner diameter (to be specific, a seat diameter $r_1$) of the secondary side region 21$g$ are substantially equal to each other, the portion being located on a lower end 24$d$ side of the flange 24$e$. Therefore, an acting force generated by the primary pressure $p_1$ received by the pressure receiving surface P1 and an acting force generated by the primary pressure $p_1$ received by the pressure receiving surface P2 cancel each other, so that influences due to the fluctuation in the primary pressure $p_1$ on the valve body 24 can be substantially eliminated.

In the electromagnetic pressure regulating valve 6, a tip end of the valve body 24 and a tapered surface of the tapered portion 24$b$ (that is, a pressure receiving surface P3) receive in the direction toward the open position the secondary pressure $p_2$ flowing in the secondary side region 21$g$, and the diaphragm seal 29 and the lower end 24$d$ of the valve body 24 (that is, a pressure receiving surface P4) receive in the direction toward the closed position the secondary pressure $p_2$ introduced to the pressure return chamber 31. The pressure receiving surface P3 is a region overlapping the secondary side region 21$g$ in plan view. The secondary pressure $p_2$ applied to the pressure receiving surface P3 and the secondary pressure $p_2$ applied to the pressure receiving surface P4 respectively act in directions opposite to each other.

The pressure receiving area of the pressure receiving surface P3 is determined depending on the seat diameter $r_1$, and the pressure receiving area of the pressure receiving surface P4 is determined depending on an effective diameter $r_3$ of the diaphragm seal 29. The seat diameter $r_1$ is substantially equal to the outer diameter $r_2$ of the valve body 24, and the effective diameter $r_3$ of the diaphragm seal 29 is larger than each of the seat diameter $r_1$ and the outer diameter $r_2$ of the valve body 24. Therefore, the pressure receiving area of the pressure receiving surface P4 is larger than that of the pressure receiving surface P3. With this, an acting force generated by the secondary pressure $p_2$ received by the pressure receiving surface P3 and an acting force generated by the secondary pressure $p_2$ received by the pressure receiving surface P4 do not completely cancel each other, and an acting force corresponding to the difference between the pressure receiving areas of the pressure receiving surfaces P3 and P4 acts on the valve body 24 in the direction toward the closed position.

In addition to these acting forces, the valve body 24 is biased by the return spring 33 in the direction toward the closed position. Therefore, the electromagnetic pressure regulating valve 6 is configured such that the valve body 24 is seated on the seat portion 23 in a state where the current to the solenoid coil 35 is shut off. Thus, the electromagnetic pressure regulating valve 6 is configured as a normally closed valve. The electromagnetic pressure regulating valve 6 configured as above is utilized as a shutoff valve. When the detected pressure of the low-pressure-side pressure sensor 9 becomes allowable pressure or higher, the controller 10 shut off the current supplied to the solenoid coil 35 to cause the electromagnetic pressure regulating valve 6 to urgently shut off the valve passage 22. With this, for example, even if the fuel gas of unintended high pressure is supplied to the gas injector 5, the supply passage 4 can be immediately shut off, and the gas injector 5 can be prevented from being damaged.

Since the electromagnetic pressure regulating valve 6 has the shutoff function, the number of shutoff valves provided on the supply passage 4 can be reduced. Thus, the number of components of the fuel gas supply system 1 can be reduced, and the manufacturing cost of the fuel gas supply system 1 can be reduced. In addition, by reducing the number of shutoff valves, the pressure loss in the fuel gas supply system 1 can be reduced. With this, the service pressure limit of the high-pressure tank 3 can be lowered, and the cruising distance of the automobile can be increased significantly. Further, by reducing the number of shutoff valves, the fuel gas supply system 1 can be reduced in size.

Operations of Electromagnetic Pressure Regulating Valve

Hereinafter, operations of the electromagnetic pressure regulating valve 6 will be explained in reference to FIG. 2. First, the controller 10 supplies to the solenoid coil 35 a current corresponding to the target pressure transmitted from the ECU to the controller 10. With this, the magnetizing force acts on the movable member 38, and the movable member 38 is attracted toward the yoke 36. Therefore, the valve body 24 is pushed by the pushing member 41 in the direction toward the open position to be separated from the seat portion 23. Thus, the valve passage 22 opens, and the fuel gas in the valve space 21e flows toward the secondary side region 21g. At this time, the pressure of the fuel gas flowing from the valve space 21e to the secondary side region 21g is reduced to the secondary pressure $p_2$ by an orifice (not shown) formed between the valve body 24 and the seat portion 23.

The fuel gas of the secondary pressure $p_2$ flows through the secondary side passage 21f to be output through the secondary port 21c, and a part of the fuel gas flows through the pressure equalizing passage 32 to be introduced to the pressure return chamber 31. The diaphragm seal 29 receives the secondary pressure $p_2$ of the fuel gas introduced to the pressure return chamber 31. The valve body 24 moves up to a position where the magnetizing force received by the movable member 38, the acting force generated by the secondary pressure $p_2$ received by the pressure receiving surface P3, the acting force generated by the secondary pressure $p_2$ received by the pressure receiving surface P4, and the spring force of the return spring 33 are balanced. In order to balance the above forces, the opening degree of the valve passage 22 (to be specific, the opening degree of the orifice) is adjusted. With this, even if the secondary pressure $p_2$ fluctuates, the opening degree of the valve passage 22 is adjusted, and the secondary pressure $p_2$ is returned to the target pressure. Therefore, the secondary pressure $p_2$ is maintained at the target pressure.

More specifically, for example, in a case where the secondary pressure $p_2$ is lower than the target pressure, the force generated by the magnetizing force and acting in the direction toward the open position becomes larger than the total of the acting force generated by the secondary pressure $p_2$ and the force generated by the spring force and acting in the direction toward the closed position. Thus, the valve body 24 moves in the direction toward the open position so as to be separated from the seat portion 23. Therefore, the opening degree of the valve passage 22 increases, and this increases the secondary pressure $p_2$. On this account, the valve body 24 moves up to a position where the acting force generated by the secondary pressure $p_2$, the magnetizing force, and the spring force of the return spring 33 are balanced, that is, a position where the secondary pressure $p_2$ becomes the target pressure. Thus, the secondary pressure $p_2$ is returned to the target pressure. As above, even if the secondary pressure $p_2$ fluctuates, the electromagnetic pressure regulating valve 6 can control the opening degree of the valve passage 22 in accordance with the fluctuation in the secondary pressure $p_2$ to regulate the secondary pressure $p_2$ to the target pressure. Therefore, the electromagnetic pressure regulating valve 6 is high in pressure controllability and can more precisely regulate the pressure of the high-pressure fuel gas to the target pressure. In a case where the secondary pressure $p_2$ is higher than the target pressure, the valve body 24 moves in an opposite manner as above, that is, moves toward the close direction such that the secondary pressure $p_2$ is returned to the target pressure.

In the electromagnetic pressure regulating valve 6 configured to operate as above, the valve body 24 is supported by the bearing member 27 so as to be movable smoothly. Therefore, even if the secondary pressure $p_2$ fluctuates, the valve body 24 moves quickly such that the secondary pressure $p_2$ is returned to the target pressure. On this account, the followability of the electromagnetic pressure regulating valve 6 with respect to the target pressure can be improved. With this, the fluctuation range of the secondary pressure $p_2$ can be reduced.

Operation of Supplying Fuel Gas

Hereinafter, an operation of supplying the fuel gas in the fuel gas supply system 1 will be explained in reference to FIG. 1. In the fuel gas supply system 1, the electromagnetic on-off valve 7 is activated by, for example, a command of the ECU to open the supply passage 4, and the fuel gas in the high-pressure tank 3 is supplied to the electromagnetic pressure regulating valve 6. The pressure of the supplied fuel gas is regulated to the target pressure by the electromagnetic pressure regulating valve 6 as described above. Then, the fuel gas flows through the supply passage 4 to be introduced to the gas injector 5. At this time, the pressure of the fuel gas is detected by the low-pressure-side pressure sensor 9, and the detection result is transmitted to the controller 10.

The controller 10 compares the pressure of the fuel gas detected by the low-pressure-side pressure sensor 9 (to be specific, detected pressure) and the target pressure. In a case where the detected pressure is lower than the target pressure, to eliminate the difference between the detected pressure and the target pressure, the current supplied to the electromagnetic pressure regulating valve 6 is increased to increase the opening degree of the valve passage 22, thereby increasing the secondary pressure $p_2$ of the electromagnetic pressure regulating valve 6. Then, when the detected pressure reaches the target pressure, the current supplied to the electromagnetic pressure regulating valve 6 is maintained to maintain the opening degree of the valve passage 22. In a case where the detected pressure is higher than the target pressure since the current supplied to the electromagnetic pressure regulating valve 6 is increased too much, to eliminate the difference between the detected pressure and the target pressure, the current supplied to the electromagnetic pressure regulating valve 6 is decreased to decrease the opening degree of the valve passage 22, thereby decreasing the secondary pressure $p_2$.

As above, the controller 10 adjusts the secondary pressure $p_2$ output from the electromagnetic pressure regulating valve 6, that is, performs the feedback control such that the pressure (to be specific, supply pressure) of the fuel gas introduced to the gas injector 5 becomes the constant target pressure. Thus, the supply pressure can be maintained at the target pressure. With this, the supply pressure can be controlled with a high degree of accuracy and can be maintained at more stable constant pressure. In addition, the fuel gas of the mass flow rate which is highly accurate with respect to the command from the ECU can be supplied to the gas engine 2. It is desirable that in the gas engine automobile, the supply pressure to the gas injector 5 be maintained constant. Here, in the fuel supply system 1 of the present invention, the target pressure may be set to a constant value, and this control operation is easy. Thus, the fuel gas supply device 1 is preferably applicable to the gas engine automobile.

In the electromagnetic pressure regulating valve 6 configured as above, since the pressure receiving areas of the pressure receiving surfaces P1 and P2 are substantially equal to each other, the acting forces generated by the primary pressure pr received by the valve body 24 cancel each other. With this, even if the primary pressure pr fluctuates by for example, the reduction in the remaining amount of fuel gas in the high-pressure tank 3, the fluctuation in the acting force applied to the valve body due to the fluctuation in the primary pressure pr can be suppressed. Therefore, the pressure controllability with respect to the high-pressure fuel gas can be improved, and the secondary pressure $p_2$ can be controlled more precisely. In addition, by canceling the acting forces generated by the primary pressure pr, the magnetizing force of the electromagnetic proportional solenoid 34 can be reduced, and therefore the electromagnetic pressure regulating valve 6 can be reduced in size. The pressure receiving areas of the pressure receiving surfaces P1 and P2 do not have to be substantially equal to each other. Since the above-described feedback control is being performed, the supply pressure can be stably maintained at the target pressure with a high degree of accuracy even if the pressure receiving areas are different from each other.

Embodiment 2

A fuel gas supply system 1A according to Embodiment 2 is similar in configuration to the fuel gas supply system 1 according to Embodiment 1. Therefore, regarding the fuel gas supply system 1A, only components different from those of the fuel gas supply system 1 according to Embodiment 1 will be explained. The same reference signs are used for the same components, and a repetition of the same explanation is avoided.

In the fuel gas supply system 1A according to Embodiment 2, only the electromagnetic on-off valve 7 is provided at the valve block 11, and a container main valve 12A is constituted by the electromagnetic on-off valve 7. The components other than the electromagnetic on-off valve 7, that is, the electromagnetic pressure regulating valve 6, the safety relief valve 8, and the high-pressure-side pressure sensor 54 are provided at a separate block 13 provided separately from the valve block 11.

Even in a case where the components, such as the electromagnetic pressure regulating valve 6, are provided at the separate block 13, the supply pressure to the gas injector 5 can be stably maintained at the target pressure with a high degree of accuracy by the feedback control. Thus, a desired amount of fuel gas can be injected and supplied from the gas injector 5 to the gas engine 2 with a high degree of accuracy.

Other than the above, the fuel gas supply system 1A according to Embodiment 2 has the same operational advantages as the fuel gas supply system 1 according to Embodiment 1.

Embodiment 3

A fuel gas supply system 1B according to Embodiment 3 is similar in configuration to the fuel gas supply system 1 according to Embodiment 1. Therefore, regarding the fuel gas supply system 1B according to Embodiment 3, only components different from those of the fuel gas supply system 1 according to Embodiment 1 will be explained.

In the fuel gas supply system 1B according to Embodiment 3, the electromagnetic pressure regulating valve 6, the electromagnetic on-off valve 7, the safety relief valve 8, and the thigh-pressure-side pressure sensor 54 are provided at the separate block 13 provided separately from the valve block 11. In addition, a manual on-off valve 14 is provided at the valve block 11. The manual on-off valve 14 is provided on the supply passage 4 so as to be located further upstream of the electromagnetic on-off valve 7 and can open and close the supply passage 4. The manual on-off valve 14 is a manually manipulated valve configured to be operated manually. When the leakage from the supply passage 4 has occurred or when fixing the block 13 or replacing the block 13 with a new one, the manual on-off valve 14 is manipulated to close the supply passage 4. The manual on-off valve 14 configured as above constitutes a container main valve 12B.

Even in a case where the manual on-off valve 14 is provided on the supply passage 4 as above, the supply pressure to the gas injector 5 can be stably maintained at the target pressure with a high degree of accuracy by the feedback control. Thus, a desired amount of fuel gas can be injected and supplied from the gas injector 5 to the gas engine 2 with a high degree of accuracy.

Other than the above, the fuel gas supply system 1B according to Embodiment 3 has the same operational advantages as the fuel gas supply system 1 according to Embodiment 1.

Embodiment 4

A fuel gas supply system 1C according to Embodiment 4 is similar in configuration to the fuel gas supply system 1 according to Embodiment 1. Therefore, regarding the fuel gas supply system 1C according to Embodiment 4, only components different from those of the fuel gas supply system 1 according to Embodiment 1 will be explained.

In the fuel gas supply system 1C, the electromagnetic pressure regulating valve 6 and the safety relief valve 8 are provided at the separate block 13 provided separately from the valve block 11, and an intermediate pressure sensor 60 is provided on the supply passage 4 so as to be interposed between the valve block 11 and the electromagnetic pressure regulating valve 6. In addition, the fuel gas supply system 1C further includes a mechanical pressure reducing valve 61 and an intermediate pressure relief valve 62. The mechanical pressure reducing valve 61, the intermediate pressure relief valve 62, the electromagnetic on-off valve 7, and the high-pressure-side pressure sensor 54 are provided at the valve block 11 and constitute a container main valve 12C.

The mechanical pressure reducing valve 61 is provided on the supply passage 4 so as to be interposed between the electromagnetic on-off valve 7 and the electromagnetic pressure regulating valve 6, more specifically, located downstream of the high-pressure-side pressure sensor 54. The mechanical pressure reducing valve 61 is a valve configured to adjust the opening degree of the supply passage 4 in accordance with downstream pressure and reduce the downstream pressure to pressure higher than the supply pressure supplied to the gas injector 5. The intermediate pressure relief valve 62 is provided downstream of the mechanical pressure reducing valve 61. When the pressure between the mechanical pressure reducing valve 61 and the electromagnetic pressure regulating valve 6 becomes predetermined pressure (pressure lower than withstand pressure in a pipe outside the electromagnetic pressure regulating valve 6 and the valve block 11), the intermediate pressure relief valve 62 operates to release the fuel gas to the atmosphere.

In the fuel gas supply system 1C configured as above, after the high pressure of the fuel gas is reduced to intermediate pressure by the mechanical pressure reducing valve 61, the intermediate pressure of the fuel gas is reduced to the low pressure by the electromagnetic pressure regulating valve 6. Therefore, the pressure of the fuel gas can be reduced to stable constant pressure with a high degree of accuracy. With this, the fuel gas of the mass flow rate which is highly accurate can be supplied to the gas engine 2. In addition, by reducing the high pressure of the fuel gas to the intermediate pressure by the mechanical pressure reducing valve 61, the output pressure level from the valve block 11 can be suppressed, and the pressure loss in the supply passage 4 can be suppressed as compared to a case where the high pressure of the fuel gas is reduced to the low pressure at once. By suppressing the pressure loss in the supply passage 4, the service limit pressure in the high-pressure tank 3 can be further lowered. Therefore, by reducing the high pressure of the fuel gas to the intermediate pressure, the service pressure limit of the high-pressure tank 3 can be lowered while improving the safety of the fuel gas supply system 1C.

Moreover, even if various components are provided on the supply passage 4 as in the present embodiment, the supply pressure to the gas injector 5 can be maintained at stable pressure with a high degree of accuracy by the feedback control. Thus, a desired amount of fuel gas can be injected and supplied from the gas injector 5 to the gas engine 2 with a high degree of accuracy.

Other than the above, the fuel gas supply system 1C according to Embodiment 4 has the same operational advantages as the fuel gas supply system 1 according to Embodiment 1.

Other Embodiment

In Embodiments 1 to 4, the diaphragm seal 29 receives the secondary pressure $p_2$ of the pressure return chamber 31. However, the present embodiment is not limited to the diaphragm seal, and a low-pressure sealing member, such as an O ring, may be used. In this case, by making an outer diameter of a lower end side of the valve body 24 larger than the seat diameter, the present embodiment can obtain the same operational advantages as the electromagnetic pressure regulating valve 6 according to Embodiment 1. The electromagnetic pressure regulating valve 6 of the present embodiment is a push-type electromagnetic pressure regulating valve. However, the electromagnetic pressure regulating valve 6 of the present embodiment may be a pull-type electromagnetic pressure regulating valve.

Each of Embodiments 1 to 4 shows an example of the arrangement of the respective components, but the arrangement may be changed without changing a basic component circuit. For example, in Embodiment 4, the mechanical pressure reducing valve 61 may be provided at the separate block. Further components may be added, eliminated, or changed within the spirit of the present invention. For example, the intermediate pressure relief valve 62 may be eliminated, or an electromagnetic on-off valve configured to urgently shut off the supply passage 4 may be added so as to be located downstream of the electromagnetic pressure regulating valve 6.

Further, each of Embodiments 1 to 4 has explained a case where the fuel gas is supplied to the gas engine 2 by the gas injector 5. However, a low pressure regulating valve may be used instead of the gas injector 5. In addition, although the ECU and the controller 10 are configured separately in Embodiments 1 to 4, the controller 10 may be incorporated in the ECU.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is applicable to a fuel gas supply system of a gas engine, the fuel supply system being configured to supply a fuel gas to the gas engine.

REFERENCE SIGNS LIST 1, 1A to 1C fuel gas supply system
2 gas engine
3 high-pressure tank
4 supply passage
5 gas injector
6 electromagnetic pressure regulating valve
7 electromagnetic on-off valve
9 low-pressure-side pressure sensor
10 controller
12, 12A to 12C container main valve
21 housing
21a primary port
21c secondary port
22 valve passage
24 valve body
27 bearing member
28 high-pressure sealing member
29 diaphragm seal
31 pressure return chamber
33 return spring
34 electromagnetic proportional solenoid

The invention claimed is:

1. A fuel gas supply system of a gas engine, the fuel gas supply system being configured to supply a fuel gas to the gas engine, the fuel gas supply system comprising:

a fuel gas supply unit configured to supply the fuel gas to the gas engine;

a supply passage configured to connect a high-pressure tank configured to store the fuel gas of high pressure and the fuel gas supply unit;

an electromagnetic pressure regulating valve provided on the supply passage and configured to regulate pressure of the fuel gas, flowing through the supply passage, to pressure corresponding to a current supplied to the electromagnetic pressure regulating valve;

a control unit configured to control the current supplied to the electromagnetic pressure regulating valve; and a low-pressure-side pressure detecting unit provided closer to the fuel gas supply unit than the electromagnetic pressure regulating valve and configured to detect the pressure of the fuel gas, wherein the electromagnetic pressure regulating valve is a normally closed valve configured to close the supply passage when the current supplied from the control unit is stopped;

wherein the control unit controls the current such that gas pressure detected by the low-pressure-side pressure detecting unit becomes predetermined target pressure, wherein the electromagnetic pressure regulating valve includes:
- a housing including a valve passage connecting a primary port connected to the high-pressure tank and a secondary port connected to the gas engine,
- a valve body provided in the housing and configured to move between a closed position where the valve body closes the valve passage and an open position the valve body opens the valve passage to control an open degree of the valve passage,
- a return spring configured to bias the valve body in a direction toward the closed position,
- an electron proportional solenoid configured to apply a magnetizing force, corresponding to the current supplied from the control unit, to the valve body to cause the valve body to move in a direction toward the open position,
- a bearing member interposed between the valve body and the housing and configured to support the valve body such that the valve body is able to slide between the closed position and the open position, and
- a first sealing member and a second sealing member configured to respectively seal both sides of the bearing member;

wherein a pressure return chamber connected to the secondary port is formed in the housing, and wherein the second sealing member applies an acting force, corresponding to internal pressure of the pressure return chamber, to the valve body to cause the valve body to move in the direction toward the closed position.

2. The fuel gas supply system according to claim 1, wherein:
the valve body includes a secondary side pressure receiving portion on which pressure of the secondary port acts in a direction in which the valve body moves toward the open position and a pressure return chamber side pressure receiving portion on which pressure of the pressure return chamber acts in a direction in which the valve body moves toward the closed position; and
a pressure receiving area of the pressure return chamber side pressure receiving portion is larger than a pressure receiving area of the secondary side pressure receiving portion.

3. The fuel gas supply system according to claim 1, wherein:
the valve body includes a first pressure receiving surface on which pressure of the primary port acts in a direction in which the valve body moves toward the open position and a second pressure receiving surface on which the pressure of the primary port acts in a direction in which the valve body moves toward the closed position; and
a pressure receiving area of the first pressure receiving surface and a pressure receiving area of the second pressure receiving surface are substantially equal to each other.

4. The fuel gas supply system according to claim 1, wherein the low-pressure-side pressure detecting unit is provided near the gas supply unit.

5. The fuel gas supply system according to claim 1, wherein when the gas pressure detected by the low-pressure-side pressure detecting unit becomes predetermined allowable pressure or higher, the control unit stops the current supplied to the electromagnetic pressure regulating valve.

6. The fuel gas supply system according to claim 1, further comprising an electromagnetic on-off valve provided on the supply passage so as to be located upstream of the electromagnetic pressure regulating valve and configured to be able to shut off supply of the fuel gas to the electromagnetic pressure regulating valve.

7. The fuel gas supply system according to claim 1, wherein the electromagnetic pressure regulating valve is included in an in tank type or on tank type container main valve provided at a supply port of the high-pressure tank.

* * * * *